United States Patent [19]
Elsing

[11] 4,008,492
[45] Feb. 15, 1977

[54] THERMALLY STABILIZED ENCLOSURE FOR MAGNETIC DISK

[75] Inventor: John W. Elsing, Edina, Minn.

[73] Assignee: Control Data Corporation, Minneapolis, Minn.

[22] Filed: July 23, 1975

[21] Appl. No.: 598,517

[52] U.S. Cl. .................................. 360/98; 360/133
[51] Int. Cl.² .................. G11B 17/00; G11B 23/02
[58] Field of Search ............ 360/98, 102, 103, 133; 55/473, 385

[56] References Cited

UNITED STATES PATENTS

| | | | |
|---|---|---|---|
| 3,624,624 | 11/1971 | Johnson | 360/98 |
| 3,710,357 | 1/1973 | Buslik | 360/98 |
| 3,720,930 | 3/1973 | Elsing | 360/98 |
| 3,723,980 | 3/1973 | Gabor | 360/98 |
| 3,731,291 | 5/1973 | Walsh | 360/98 |
| 3,800,325 | 3/1974 | O'Brien | 360/98 |
| 3,846,835 | 11/1974 | Horovitz et al. | 360/98 |
| 3,882,473 | 5/1975 | Hoehmann | 360/98 |

Primary Examiner—Vincent P. Canney
Attorney, Agent, or Firm—William J. McGinnis, Jr.

[57] ABSTRACT

In a magnetic memory storage device an enclosure is provided to contain the disk pack assembly and the recording head carrying arms, the enclosure being adapted for supplying filtered cooling air, thus eliminating heat generated in the operation of the equipment; and for reducing temperature gradients between the components within the enclosure. The spinning disks of the disk pack act as a centrifugal air pump and a shroud forming part of the enclosure is spirally shaped to increase the air flow through a sized air inlet thus reducing warmup time. This basic flow pattern is enhanced by the addition of two lesser air flow patterns, from above the pack and from below the pack around the drive spindle, so that an excess of cool incoming air does not contact the disks, thereby balancing top inlet air with bottom inlet air to control air movement.

6 Claims, 4 Drawing Figures

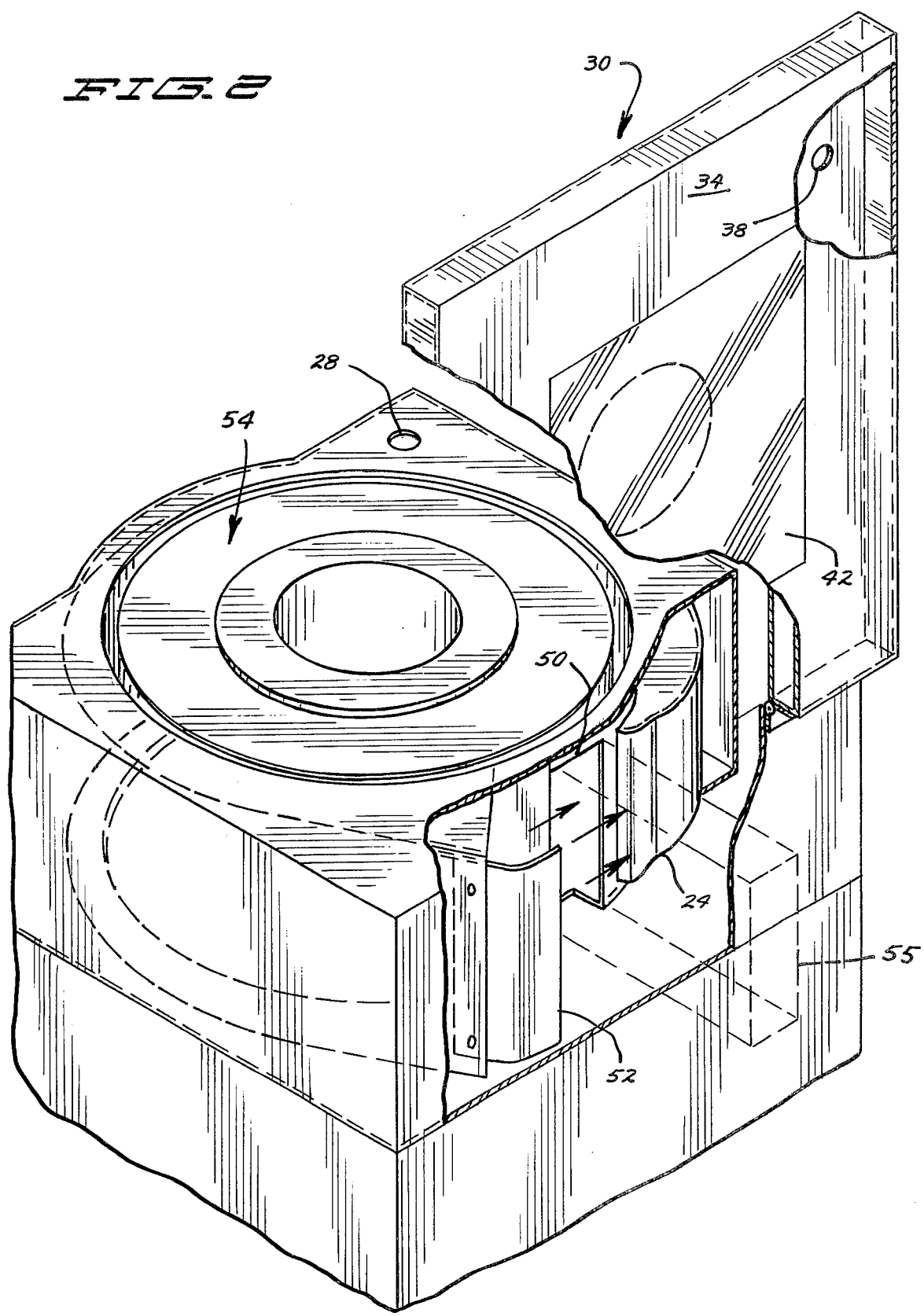

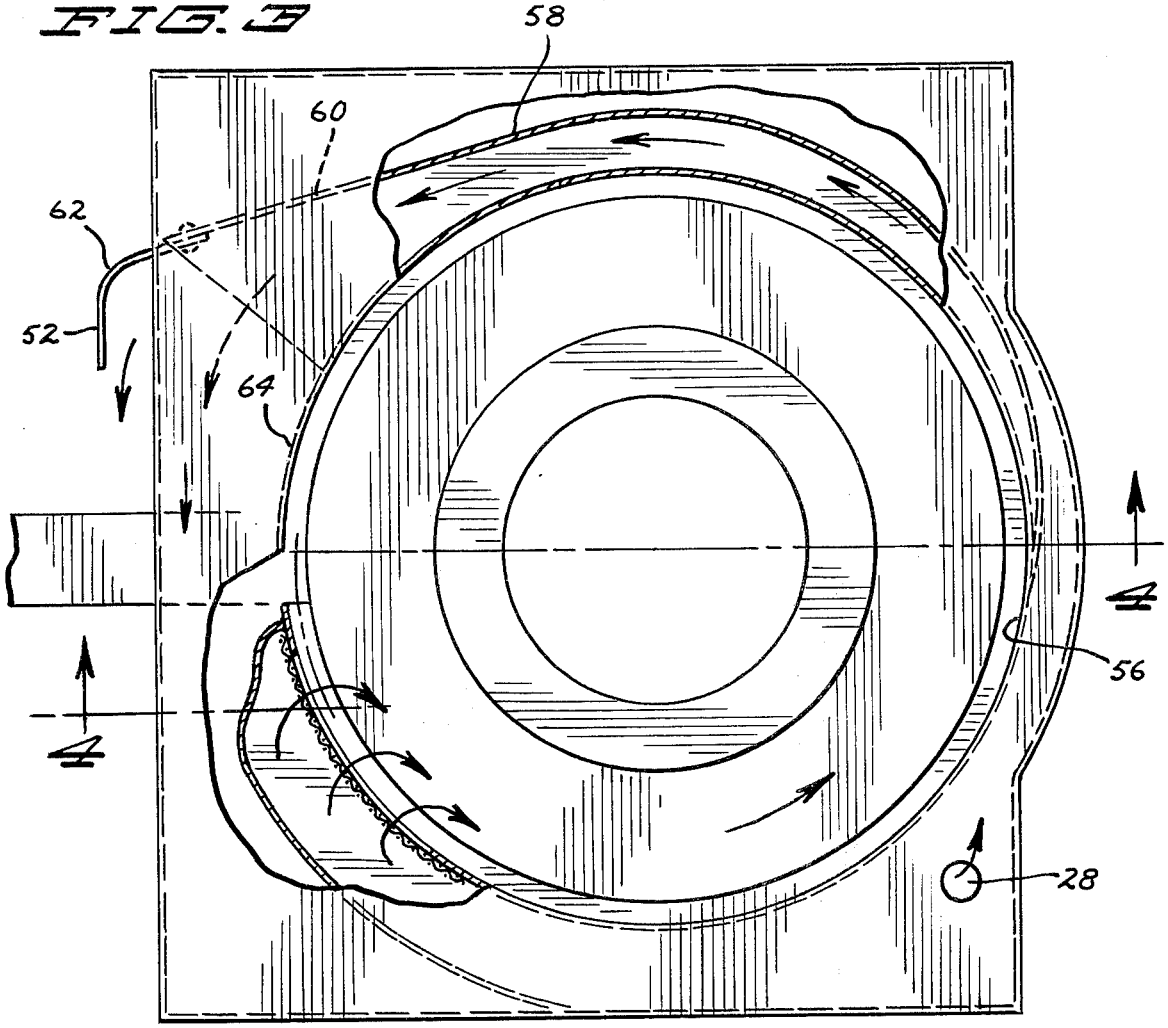
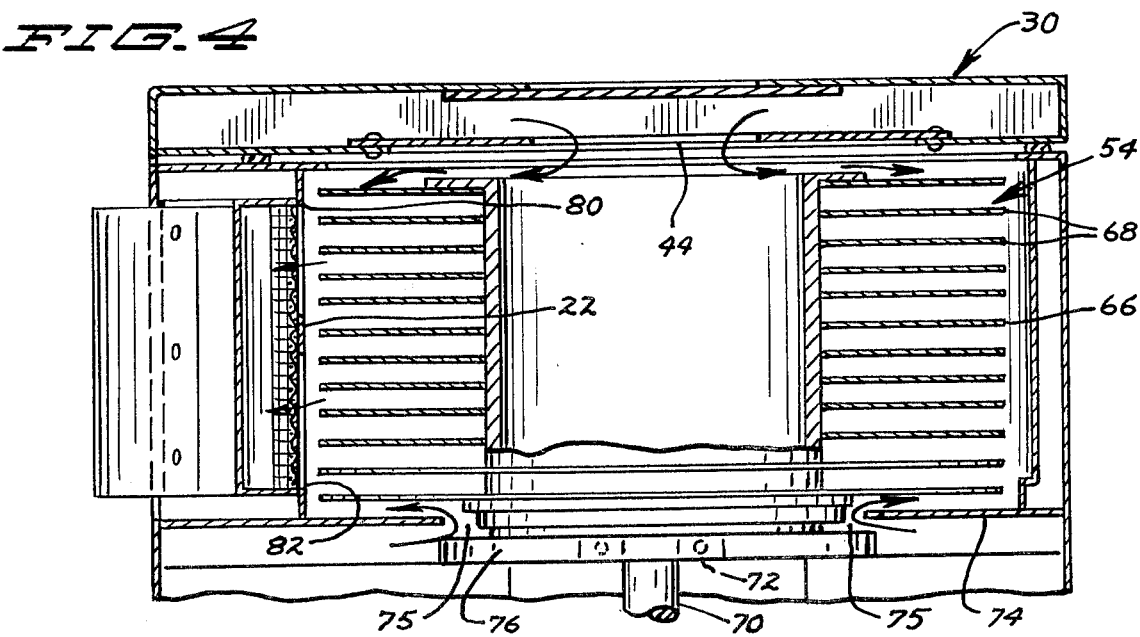

THERMALLY STABILIZED ENCLOSURE FOR MAGNETIC DISK

BACKGROUND OF THE INVENTION

This invention relates to enclosures for magnetic disk memory storage units of the type used for computer systems. In particular this invention relates to an enclosure for the disk pack in a, so called, high density storage unit in which the disk pack contains multiple disks, such as 10 recording disks including a servo disk, turning at high speeds, such as 3600 revolutions per minute, and high track densities of around 400 tracks per inch of information on the disks.

In such applications thermal considerations are quite important for several reasons. First, from startup of the magnetic disk unit until the unit is thoroughly warmed up, operating characteristics cannot be allowed to change much from temperature effects or errors will occur. The best way to minimize change in operating characteristics is to reduce the temperature change from the startup period to the thoroughly warmed up state. Further, temperature differences between various disks and head arms on the disk pack unit cannot be allowed to occur relative to the servo disk and servo head arm because differences in characteristics of the units could cause a temperature induced displacement in the disk. Finally, the ultimate warmed up temperature of the unit must be limited in order to assure best operating conditions.

Heat can occur or be generated in three fashions in the shrouded disk area. Spindle bearing, or spindle heat and the longer time constant for warm-up of the larger spindle mass compared to that of the disk causes the two to three disks next to the spindle to heat up much slower than the rest of the disks. Secondly, heat can be generated by disk windage; and thirdly, by the variable windage associated with the heads and supporting arms as they move out over the disks. Windage is used here to refer to heat generated by air turbulence or movement with respect to an object causing air to surface friction. With one or two magnetic disks and a magnetic disk memory unit, some of these, so called, windage effects would be comparatively small. But, with as many as 10 or perhaps more disks in a single unit, the amount of rotating surface in contact with air increases dramatically along with the potential for producing heat. Similarly with a 10 unit stack there are a substantial number of head arms in the enclosure which are in the path of moving air, all of which create air turbulence.

Specifically, these various factors of heat sources or heat production inside the disk pack enclosure produce at least four identifiable types of thermal drift or temperature changes which can cause changes in operating characteristics. The first of these is referred to as "active drift" which is associated with the change in disk diameter and head arm length as related to arm carriage position. This refers to the heat generated by turbulence of the stationary head arms as they move in and out of the enclosure to bring the heads into operating relation with the different tracks on the stack of disks. The worst case in this type of drift is where the heads have been located on outer most tracks of a disk stack for a sufficient amount of time for the air temperature to have stabilized and then there is a call to actuate the head arms to inner most tracks thereby causing the head arms to be inserted considerably further into the enclosure thus increasing air turbulence and heat production. The additional windage load from the head arms elevates the pack area temperature and the diameter disk and head expansions must be identical for all disk and head relationships in the pack or otherwise a physical displacement will occur within the pack for the heads associated with different disks.

The next type of drift is related to a disk pack which has not been operating and has for example been on a storage shelf but is placed in a magnetic disk machine that has been operating and was merely stopped for reloading. This type of drift is referred to as "cold pack warm machine" drift and can occur over a period of about 20 minutes. Related to this of course is the third type of drift related to the temperature gradients caused when a cold pack is in a machine which has not been operating and both the disk pack and the magnetic disk unit are powered up and data processing is immediately commenced. This is "cold pack cold machine" drift. This type of drift can occur over a period as long as an hour and a half.

And finally, the fourth type of thermal drift is that related to the situation in which a warmed up or temperature stabilized disk pack is in a warmed up operating unit but the cover of the unit has to be opened and closed for adjustments of the head assemblies commonly called "head alignment," or placement of head assemblies or for whatever purpose. This difference can take up to 30 minutes to compensate for the difference in temperature with the cover on or off in a unit for only a short time.

Prior art dealing with magnetic disk pack enclosures concentrates primarily on air purification within the disk pack or cleanliness of the disk pack surfaces and does not show concern with problems relating to non-symetric heat build up and rate of heat build up in the disk pack having numerous disks. Such prior art for example does not show concern for minimizing thermal drift within the disk pack in order to minimize operating tolerance requirements for the unit. Such prior art is illustrated in the U.S. Pat. Nos. 3,710,540; 3,731,291; and 3,839,734.

SUMMARY OF THE INVENTION

The present invention is an enclosure for a magnetic disk pack which minimizes the effects of temperature change of the unit between non-operating and fully warmed up operating conditions and minimizes temperature differences or gradients between the various portions of a disk pack operating within the unit.

The present invention consists of an enclosure containing a drive spindle for a magnetic disk pack and having a sealable cover to enclose the unit and the disk pack during operating conditions. The enclosure has a disk shroud which is generally circular about much of the circumferance of a disk pack but gradually opens in a spiral fashion into an exhaust port immediately upwind of an opening adapted for the insertion and removal of head arms. The spiral wall significantly increases the normal air pumping action of the pack, causing quicker response to machine warmup, and greater control of the air flow. Here, upwind and downwind refer to air moving with the rotating disk pack. Immediately downwind of the opening for the head arms, in a location where there would be air turbulence caused by insertion of the head arms, is an air inlet port which allows clean, cool fresh air from outside of the unit to enter a clean air plenum chamber formed as part of the shroud surrounding the disk pack. The plenum chamber is shaped around the outside of the wall of the disk enclosure and has a fresh air inlet duct entering the plenum, an inlet port into the bottom of the disk pack chamber for clean fresh air around the spindle hub and a third small port in the upper surface thereof adapted to meet with a hole in the lower surface of the top cover assembly for incoming air on the top of the disk pack.

The top cover assembly for the unit contains a circulating air plenum with the air inlet hole, just described, and an exhaust port centered over the spindle so that a certain predetermined amount of air flows downwardly over the top disk in the disk pack. This air is predetermined to flow in an amount to match the effects of a small amount of air entering around the spindle hub in the bottom of the chamber causing air to flow around the bottom disk in the disk pack. The predetermined metered amount of air in the cover assembly nearly matches the air flow into the bottom of the chamber so that the air currents offset one another to create balanced movement of air in the chamber. Air entering from the inlet port tends to leave at approximately the same vertical altitude at the exhaust port. Air turbulence in the inlet port area, downwind of the head arm assembly, tends to create a suction or vacuum effect to help cause air flow into the disk pack chamber as does the spiral shape thereof. The air inlet port has a screen therein to cause air turbulence and uniform disbursement of the air around the disk pack.

There is a servo disk blocking strip running horizontally across the inlet port opening to reduce slightly the fresh air flow onto the servo disk so that temperature changes of the servo disk will be slightly slower than the recording disks in the disk pack thereby making sure that these disks are able to properly be tracked by the head positioning mechanism following the tracks on the servo disk.

An exhaust deflector located in the shroud exhaust air stream directs this air over the head supporting arms if they are not forward into the pack area. Hence, the head supporting arms will be kept at the proper temperature so that when they do actuate into the pack, almost no change in temperature will occur.

IN THE FIGURES

FIG. 2 is a perspective looking down on the magnetic disk enclosure from the rear, with the cover raised and cut-away, showing a cut-away portion of the exhaust port and opening for the head arm assembly.

FIG. 3 is a top view of the magnetic disk enclosure shown in FIGS. 1 and 2.

FIG. 4 is a vertical section along line 4—4 of FIG. 3.

DESCRIPTION OF THE PREFERRED EMBODIMENT

Figure 1:
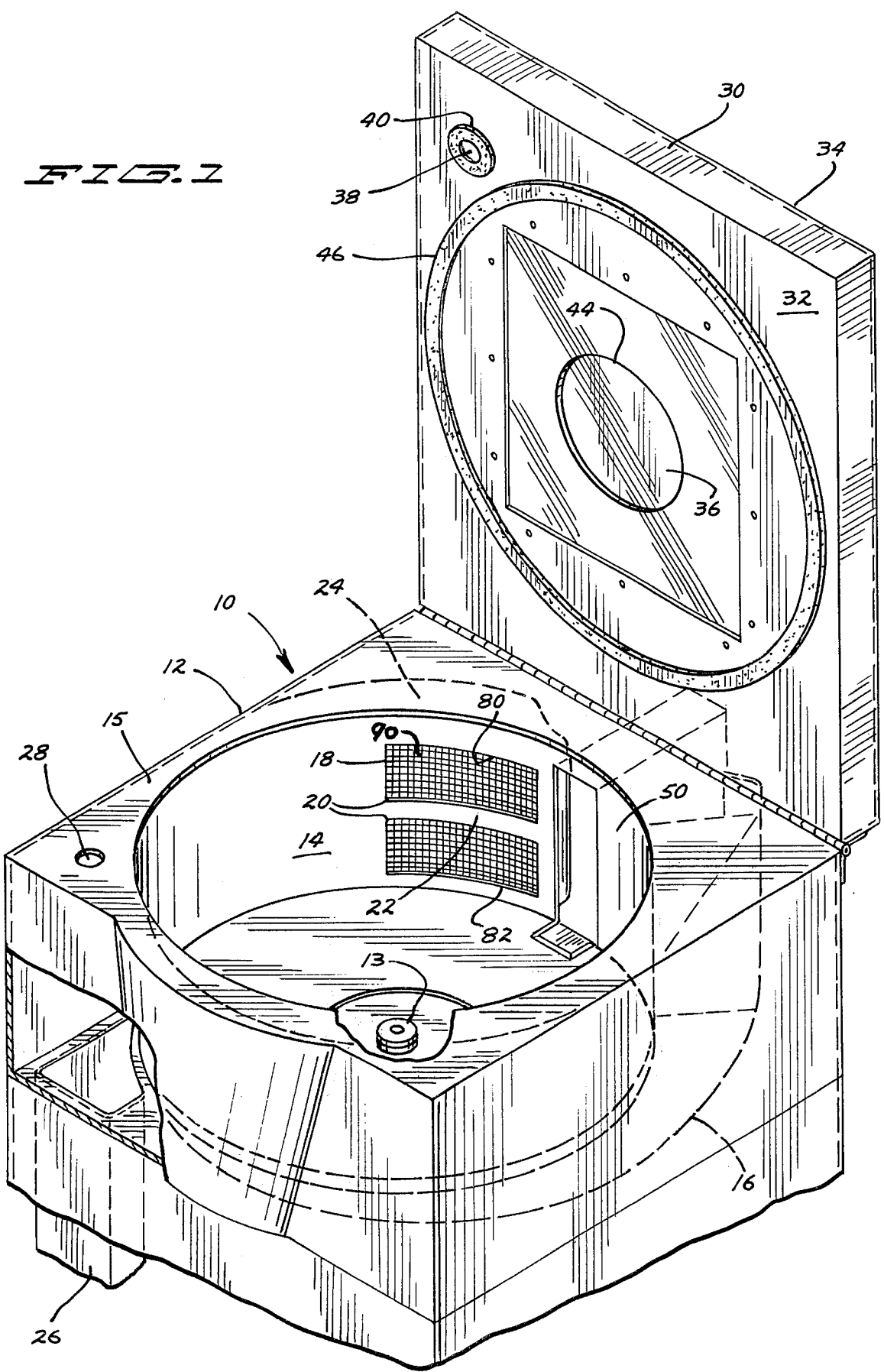
FIG. 1 is a generally frontal perspective view of a magnetic disk pack enclosure, with the cover raised, showing the air inlet port approximately centered and with a cut-away showing the air supply conduit from the clean air plenum.

Referring now to FIG. 1, a magnetic disk enclosure 10 according to one embodiment of the invention is shown. The enclosure consists of a shroud 12 having formed therewithin a chamber 14 adapted to receive a disk pack assembly, not shown in FIG. 1. The chamber has a generally circular outer wall which opens gradually into a spiralled widening exhaust passage, shown by dotted line 16. The chamber has an inlet port 18 comprised of two openings 20 with a servo disk blocking strip 22 therebetween. As will be shown in FIG. 4 this blocking strip prevents air from the inlet port from being directed at the servo disk of a disk pack.

The inlet port 18 connects into a clean air plenum 24 which is formed as part of the shroud 12 using one wall of the chamber 14 as a wall. A clean air inlet duct 26 conducts fresh, filtered, ambient temperature air into the clean air plenum 24. The clean air plenum 24 is formed so that there is an opening or port 28 therein in an upper portion thereof through which air will be forced.

The chamber has a top cover 30 comprised of a bottom surface 32 and an upper surface 34 (shown in FIG. 2). Between the two surfaces is a circulating air plenum 36. An opening 38 in the bottom surface 32 of the cover is adapted to meet with opening 28 in the upper surface of the clean air plenum, with the cover in the closed position.

The opening 38 has a gasket 40 surrounding it which is adapted to mate with the surface comprising the top of the clean air plenum. This allows air to be conducted from the clean air plenum through opening 28 and through opening 38 into the circulating air plenum 36 in the cover for the enclosure. The enclosure cover may have a small window in the top thereof through which an observer may view the magnetic disk pack in place.

The circulating air plenum has an opening therein 44 which is adapted to be generally circular and centered over the center of a disk in the chamber. Disks in the chamber are mounted on a spindle 13 located in the bottom surface thereof. Air entering the circulating air plenum 36 is allowed to pass through the opening 44 in the bottom of the cover therefore and be directed downwardly onto the top of an operating disk pack in the unit. There is also provided in the cover a gasket 46 which contacts the top plate 15 of the shroud for the purpose of preventing air from entering or leaving the chamber during operation of the unit around the edges of the cover. The shroud also has an opening 50 through which the head arm assemblies are inserted, operated and retracted during operation of the magnetic disk unit.

Referring now to FIG. 2, the top side of the cover 30 is shown. The clean air plenum is shown as it is shaped around the outside of the disk pack chamber 14 to provide air to the inlet port 18 to the area around the spindle, as well as air supply for the opening 28. In this figure as well as in FIG. 3 the construction of the chamber to provide an outwardly spiralling exhaust port in the wall is better shown. This exhaust port wall extends to a baffle 52 which directs air generally across the area of the opening 50 for the head arm assemblies. The head arm assembly area is located as indicated by a blocked in dashed line 54, to show the approximate position occupied by the various head arm assemblies applicable to this type of machine.

The purpose of the baffles directing exhaust warmed air from disk pack chamber across the head arm assembly is to pre-warm the head arms prior to entering the chamber and for example in the case of partially or fully retracted head arms, to provide some initial warming to the head arm assembly equivalent to or partially equivalent to the ambient temperature the head arm assembly will experience within the disk pack chamber.

Referring now to FIG. 3, a top view of the magnetic disk enclosure is shown with a disk pack 54 in place. The contour of the spirally shaped exhaust port is shown commencing at a point 56 approximately half way around the circumference of the disk pack 54 from where the air will actually leave the chamber. The spiral portion continues approximately one third to one quarter of the circumference of the disk pack to a point 58 where it continues in an approximately straight line orientation tangentially to the point 58 on the disk pack where the exhaust opening, or port is located.

A straight line portion 60 forming the outward portion of the exhaust port continues for what would be, on the scale of the disk packs generally in use in industry, a distance of approximately 8 to 12 inches long to a point 62 where this portion bends to an angle so that air is deflected by the baffle portion, previously described, causing exhaust air to be deflected directly across the area in which the head arm assemblies will be located. Thus the exhaust port opening is comprised of the outer wall which forms the spirally shaped widening portion of the circumference of the disk pack chamber, the straight portion and the baffle or deflector portion thereof. The inside of the exhaust port is defined by a short portion of circumferential side wall 64 that extends between what is defined as the opening for the head arm assemblies a short distance to what is defined as the inside opening of the exhaust port.

Referring now to FIG. 4, the disk pack 54 is shown in side cross sectional view. The disk pack consists of a centrally located servo disk 66 and ten record disks 68. The spindle 70 driven by a motor extends through a bearing 72 in the bottom plate 74 of the disk pack enclosure. Mounted at the upper end of shaft 70 and within the disk pack enclosure, is a hub 76 for mounting the disk pack 54.

In operation, it has been discovered that, typically, there tends to be a longer temperature stabilization time in the spindle assembly area than in the surrounding parts during initial warmup. This, of course, is due to the large mass inside the spindle. The lower disks, especially the bottom disk is thus lagging and takes longer to stabilize. The lower plenum opening 75 causes some air flow around the spindle hub 76 in the bottom of the chamber. Thus the lower disk in the disk pack is exposed to some cool air coming out on the bottom side thereof which tends to insulate the heat sink effects from the spindle, and evens the temperature distribution between the bottom disks in the pack and the middle and upper disks in the pack.

The present invention helps this spindle heat sink problem by providing air flow around the spindle hub and by balancing this out with air input through the opening 44 in the lid or top cover 30 of the unit. By varying the size of the opening 28 in the top of the air plenum which mates with the cover for the enclosure, the air entering the air chamber in cover 30, and being directed onto the top of the disk pack through opening 44, is metered to match the amount of air flow around the spindle hub 76. By balancing these air flows, the air entering from the inlet port 18 tends to go directly into the disk pack and is exhausted at approximately the same vertical level at which it entered the chamber. Thus, all disks in the disk pack are generally exposed to the same temperature and the same amount of cooling input air.

The one exception to this, is that the servo disk 66 receives somewhat less air because the servo blocking strip 22 reduces the inlet air being directed towards it. Similarly, the top edge of the inlet port 18, which is designated by reference numeral 80, and the bottom edge of the inlet port which is designated by the numeral 82, are spaced in relation to the disk pack so that the top and bottom disks respectively are above and below the edge portions. The edge portions are spaced to lie approximately half way between the top and next to top disks and the bottom and next to bottom disks respectively. This is because fresh, cool outside air is already being directed from the top of the chamber onto the top of the top disk and around the spindle hub on bottom onto the bottom of the bottom disks and these surfaces need no further cooling. The cooling therefore needs to be directed to the bottom of the top disk and the top of the bottom disk. As previously stated, this is accomplished by so spacing the top edge of the inlet port 80 to lie roughly half way between the top and next to top disks and the bottom edge 82 of the inlet port to lie roughly half way between the bottom and next to bottom disks. Also, an air inlet screen 90 may be placed in the air inlet opening to cause uniform diffusion of air into the disk pack area.

What is claimed is:

1. An enclosure in a magnetic memory storage device of the type using magnetic disks as the storage element comprising:

a shroud having a generally circular outer wall for enclosing the magnetic disk pack and having a spindle for mounting said pack on a bottom surface of said shroud and having a clean air inlet port an exhaust air port and an opening for head arm assemblies associated with said storage device, the air inlet port being located just downwind of said opening and the exhaust port just upwind of said opening, where upwind and downwind refer to the air circulation caused by the rotating disk pack when in operation a clean air plenum having a clean air inlet duct and an upper surface having a small air outlet port of a predetermined size therewithin and means communicating with said air inlet port for allowing air to flow there through air inlet means for supplying fresh air around said spindle at the bottom surface of said shroud a top cover for said enclosure for sealing said shroud when in operation and having a circulating air plenum therewithin having an inlet port to said plenum positioned to meet in the closed position with said small air outlet port in said clean air plenum and an exhaust port from said circulating air plenum positioned centrally over said disk pack spindle within said shroud when said cover is in a closed position.

2. The apparatus of claim 1 wherein the outer wall of said shroud opens into a spiral shape for at least part of its circumference leading to said exhaust air port to increase the air pumping action caused by a disk pack within said shroud.

3. The apparatus of claim 1 and further comprising an exhaust air deflector located in the exhaust air stream outside of said shroud commencing from said exhaust port and curvedly shaped to cause exhaust air to move across said opening for said head arm assemblies.

4. The apparatus of claim 1 and further comprising a servo disk blocking strip located in said clean air inlet port of said shroud for reducing air flow onto the servo disk on a disk pack in said device when in operation.

5. The apparatus of claim 1 and further comprising an air inlet screen located in said air inlet port of said shroud to provide diffusion of inlet air onto a disk pack in said device when in operation.

6. The apparatus of claim 1 wherein said air inlet port in said shroud has a top edge positioned to be half way between the top disk and the next to top disk and a bottom edge positioned to be half way between the bottom disk and next to bottom disk in a disk pack in operative position.

* * * * *